(No Model.)

J. P. HAIGH.
WHEEL FOR BARROWS.

No. 430,942. Patented June 24, 1890.

WITNESSES:
Darwin S. Wolcott
F. E. Gaither

INVENTOR.
Joseph P. Haigh
by George H. Christy
Att'y.

THE NORRIS PETERS CO., PHOTO-LITHO., WASHINGTON, D. C.

UNITED STATES PATENT OFFICE.

JOSEPH P. HAIGH, OF NEW CUMBERLAND, WEST VIRGINIA, ASSIGNOR TO HUGH KENNEDY, OF SHARPSBURG, PENNSYLVANIA.

WHEEL FOR BARROWS.

SPECIFICATION forming part of Letters Patent No. 430,942, dated June 24, 1890.

Application filed March 31, 1890. Serial No. 345,957. (No model.)

*To all whom it may concern:*

Be it known that I, JOSEPH P. HAIGH, a citizen of the United States, residing at New Cumberland, in the county of Hancock and State of West Virginia, have invented or discovered certain new and useful Improvements in Wheels for Barrows, of which improvement the following is a specification.

The invention described herein relates to certain improvements in the construction of wheels for wheelbarrows and other similar articles; and the invention has for its object a wheel wherein the hub or axle spokes and rim are formed integral with each other, and the spindle formed of wrought metal—e. g., rolled steel, &c.—is so secure within the axle as to avoid all liability of accidental displacement and yet be capable of removal for the substitution of a new spindle.

The invention claimed will be hereinafter more fully and particularly described.

Figure 1:
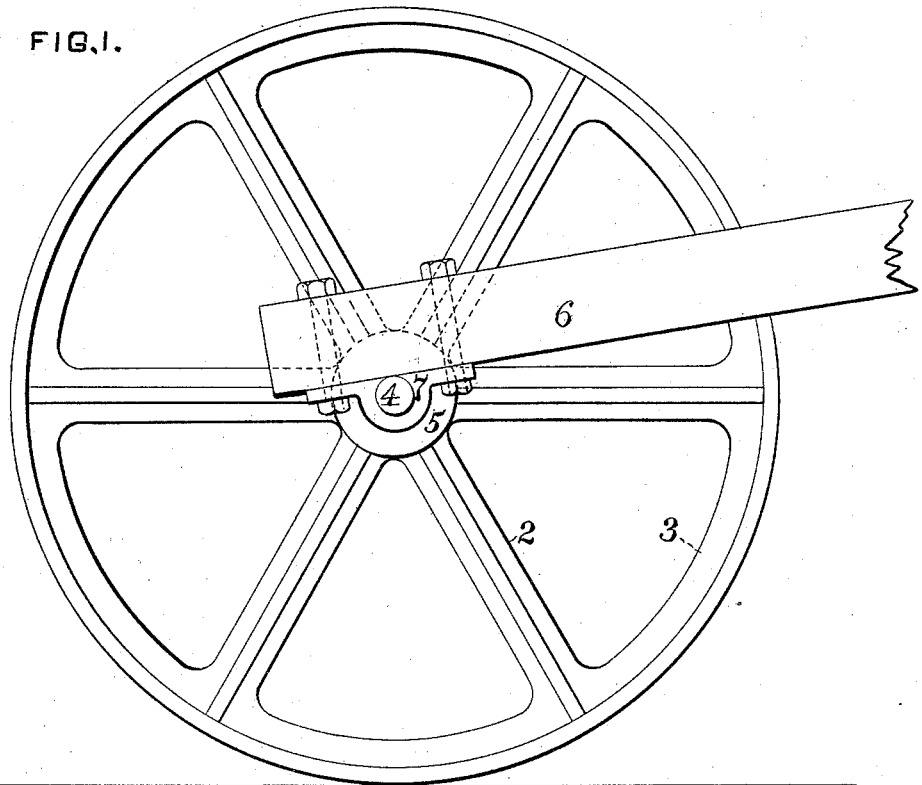
Figure 2:
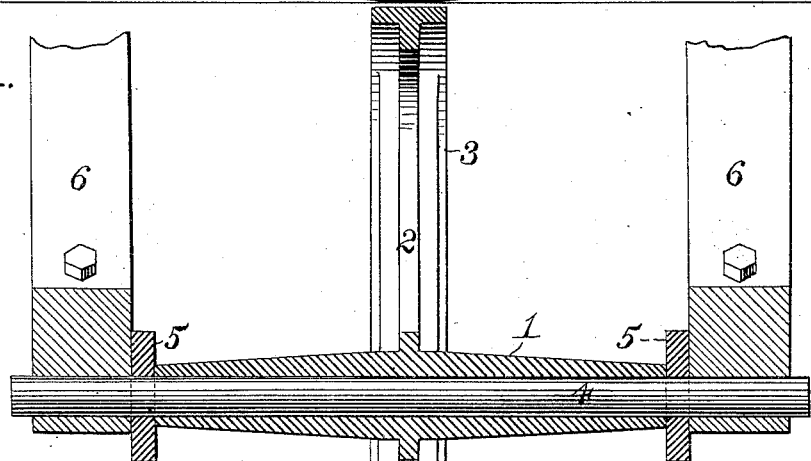
Figure 3:
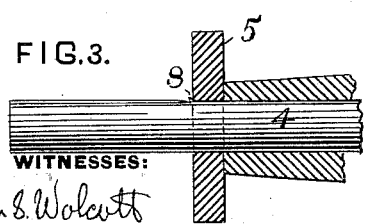

In the accompanying drawings, forming a part of this specification, Figure 1 is a view in side elevation of my improved wheel and a portion of the barrow. Fig. 2 is a sectional view, the plane of section being taken vertically through the axis of the wheel; and Fig. 3 is a sectional detail view of a modified construction.

In the practice of my invention, the wheel, consisting of the hub or axle 1, spokes 2, and rim 3, are formed integral with each other, preferably by casting in a suitable mold, provided with a core to form an axial hole through the hub or axle. By reference to Fig. 2 it will be seen that the several parts are so proportioned that the transverse dimensions of the hub or axle measuring from the axial hole outwardly, the spokes, and rim are approximately equal, thereby insuring the equal cooling of all parts, and avoiding any strains due to unequal shrinkage.

After the formation of the wheel as described, the axial hole through the hub is bored out true, and a spindle 4, preferably of cold-rolled steel, of such a diameter as to fit snugly in the axial opening is driven through said opening. Although the spindle fits the opening comparatively tight it is apt to work out when the barrow is in use. In order to avoid such accidental displacement, washers 5, having openings of slightly less diameter than the spindle are heated and then slipped over the ends of the spindle and against the ends of the hub. These washers, in cooling, shrink tightly on the spindle and cannot be removed except by reheating or being broken off. The hub 1 is made of such a length relative to the distance between the arms 6 of the barrow that the washers 5, when adjusted in position as described, will bear against the inner sides of the arms, thus forming wearing-plates, the washers being of considerably greater diameter than the hub, the arms 6 having bearings 7 secured thereon for the journals formed by the projecting ends of the spindle, or the bearings may be formed in any other suitable manner.

It will be readily understood that in case of the wearing out of the journals of the spindle or the breaking thereof, it can be easily removed and another substituted by heating the washers or bearing-plates, slipping them off, and driving out the old spindle, when another can be substituted in the manner hereinbefore stated. In lieu of shrinking the bearing-plates on they may be secured in place by forming a burr 8 on the spindle, as shown in Fig. 3.

The spindle fitting tightly within the hub and being held from longitudinal movement by the washers or bearing-plates, there will be no wearing of any of the parts except the spindle and washers, which can be readily renewed, as described, without the aid of a skilled mechanic.

I claim herein as my invention—

1. The combination of a cast-iron wheel having a laterally-extended hub, a spindle fitting closely within said hub, and bearing-plates secured to the spindle against the ends of the hub, substantially as set forth.

2. The combination of a cast-iron wheel having a laterally-extended hub, a spindle fitting closely within said hub, and bearing plates or washers bearing against the ends of the hub and shrunk upon the spindle, substantially as set forth.

In testimony whereof I have hereunto set my hand.

JOSEPH P. HAIGH.

Witnesses:
DARWIN S. WALCOTT,
R. H. WHITTLESEY.